United States Patent [19]

Veronesi

[11] Patent Number: 4,697,968
[45] Date of Patent: Oct. 6, 1987

[54] LOCKING RING

[75] Inventor: Luciano Veronesi, O'Hara, Pa.

[73] Assignee: Westinghouse Electric Corp., Pittsburgh, Pa.

[21] Appl. No.: 238,789

[22] Filed: Feb. 27, 1981

[51] Int. Cl.⁴ .................. F16B 39/28; F16B 39/34
[52] U.S. Cl. .................... 411/113; 411/124; 411/521
[58] Field of Search .............. 411/124, 123, 122, 121, 411/126, 109, 103, 113, 111, 116, 117, 119, 521, 520, 516, 517, 352, 353

[56] References Cited

U.S. PATENT DOCUMENTS

| 3,027,670 | 4/1962 | Kramer et al. | 411/521 X |
| 3,389,923 | 6/1968 | Love, Jr. et al. | 411/517 X |
| 3,752,515 | 8/1973 | Oaks | 411/517 X |
| 4,105,058 | 8/1978 | Bunn et al. | 411/113 |
| 4,327,947 | 5/1982 | Bower, Jr. | 411/521 X |

FOREIGN PATENT DOCUMENTS

| 147785 | 3/1903 | Fed. Rep. of Germany . | |
| 657344 | 3/1938 | Fed. Rep. of Germany . | |
| 869574 | 3/1953 | Fed. Rep. of Germany . | |
| 872893 | 4/1953 | Fed. Rep. of Germany | 411/123 |
| 7002382 | 4/1970 | Fed. Rep. of Germany . | |
| 2042312 | 12/1971 | Fed. Rep. of Germany | 411/123 |
| 2739644 | 3/1978 | Fed. Rep. of Germany | 411/124 |
| 954580 | 6/1949 | France | 411/122 |
| 950553 | 2/1964 | United Kingdom | 411/124 |
| 626259 | 9/1978 | U.S.S.R. . | |
| 641184 | 1/1979 | U.S.S.R. . | |
| 720211 | 3/1980 | U.S.S.R. . | |

Primary Examiner—Gary L. Smith
Assistant Examiner—Neill Wilson

[57] ABSTRACT

A locking ring for preventing inadvertent unfastening of threaded fasteners comprises a substantially cylindrical ring having a slot extending the entire width of the ring for allowing the ring to be easily compressed to fit into a counterbore that is slightly smaller than the uncompressed ring. The locking ring also comprises at least one protrusion on the outer surface of the ring that is capable of being inserted into an indentation in the counterbore when the ring is inserted in the counterbore. The locking ring is capable of having a threaded member disposed therethrough when the locking ring is disposed in the counterbore. The locking ring may also be crimped so as to engage the threaded fastener disposed therein so that the interconnection of the locking ring with the counterbore and threaded fastener prevents inadvertent unfastening of the threaded fastener.

1 Claim, 7 Drawing Figures

LOCKING RING

BACKGROUND OF THE INVENTION

This invention relates to locking devices for threaded fasteners and particularly to locking devices for countersunk threaded fasteners.

As is well known in the art, in attempting to secure two or more objects together by means of a threaded fastener, it is sometimes advisable to provide a locking cup or pin that prevents inadvertent unfastening of the objects. For example, in applications of threaded fasteners that experience significant vibration, an anti-rotation device may be used to prevent the threaded fastener from becoming unthreaded due to the vibrations. Likewise, locking pins or cups can be used to retain threaded fasteners where there is some likelihood that the threaded fasteners might fail thereby preventing separation of the threaded fastener.

There are many devices known in the art that prevent unfastening of threaded fasteners. However, most of these devices are either mechanically complicated or require many steps to install. Therefore, what is needed is a locking device that is capable of preventing inadvertent unfastening of threaded fasteners yet is simple in construction and use.

SUMMARY OF THE INVENTION

A locking ring for preventing inadvertent unfastening of threaded fasteners comprises a substantially cylindrical ring having a slot extending the entire width of the ring for allowing the ring to be easily compressed to fit into a counterbore that is slightly smaller than the uncompressed ring. The locking ring also comprises at least one protrusion on the outer surface of the ring that is capable of being inserted into an indentation in the counterbore when the ring is inserted in the counterbore. The locking ring is capable of having a threaded member disposed therethrough when the locking ring is disposed in the counterbore. The locking ring may also be crimped so as to engage the threaded fastener disposed therein so that the interconnection of the locking ring with the counterbore and threaded fastener prevents inadvertent unfastening of the threaded fastener and prevents the dislodging of the threaded fastener should the threaded fastener fracture.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

When using threaded fasteners, it is occasionally necessary to employ locking devices to prevent inadvertent unfastening of the threaded fastener. The invention disclosed herein provides a locking device for use with threaded fasteners to prevent the inadvertent or accidental unfastening of the fastener.

Referring to FIGS. 1–4, the locking ring is referred to generally as 10 and comprises a substantially cylindrical metal ring 12 which may be formed from a metal such as 304 stainless steel. Ring 12 may have a width of about 1.5 inches, a diameter of about 2.4 inches, and a thickness of about 0.03 inches. However, these dimensions can be adjusted to suit the application. Ring 12 has a slot 14 that extends the entire width thereof and provides ring 12 with flexibility and resiliency. Ring 12 is formed so that its thickness is small compared to its diameter so that ring 12 may be compressed to fit into a counterbore. At least one and preferably two protrusions 16 are formed on the outside surface of ring 12 and preferably approximately midway along the width of the ring 12. Having protrusions 16 located approximately midway along the width of ring 12 allows ring 12 to be symmetrical with respect to its top and bottom. Protrusions 16 may be about 0.1 inches in length and may be closed on its outer end or they may be open depending on how they are manufactured. Protrusions 16 may be formed by punching a hole in the inside surface of ring 12 or by punching an indentation in the inside surface of ring 12. Thus, protrusions 16 may be formed from the material of ring 12 itself.

Figure 2:
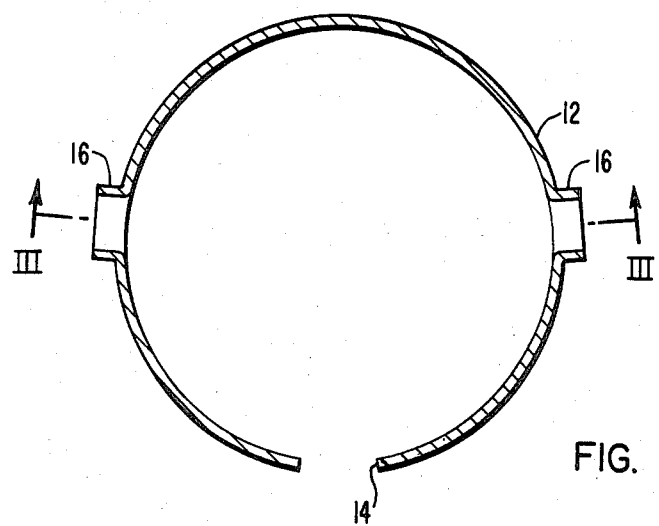
FIG. 2 is a top view of the locking ring in the uncompressed state.
Figure 3:
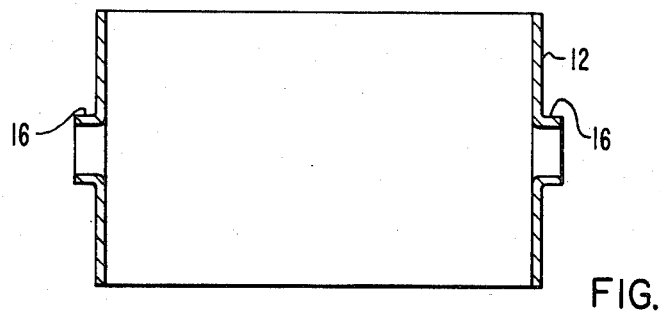
FIG. 3 is a view along line III—III of FIG. 2.
Figure 4:
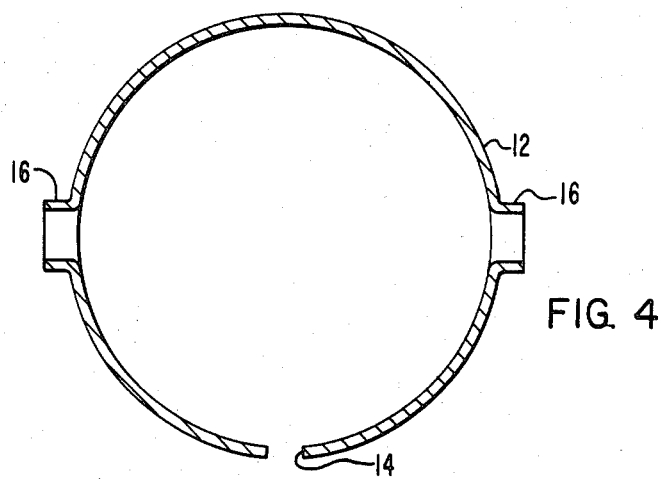
FIG. 4 is a top view of the locking ring in the compressed state.

Referring now to FIG. 2, protrusions 16 are arranged on ring 12 so that they define an included angle of about 168° when ring 12 is in the relaxed or uncompressed state. Thus, when in the relaxed state protrusions 16 generally are not arranged diametrically opposite each other. Rather, protrusions 16 may be arranged on ring 12 in a manner such that when ring 12 is compressed at least two of such protrusions 16 may be aligned diametrically opposite each other as shown in FIG. 4. Slot 14 together with the flexibility and resiliency of ring 12 provide ring 12 with the ability to be compressed thus closing the gap along slot 14 and aligning at least two protrusions 16 at about 180° from each other.

Figure 5:
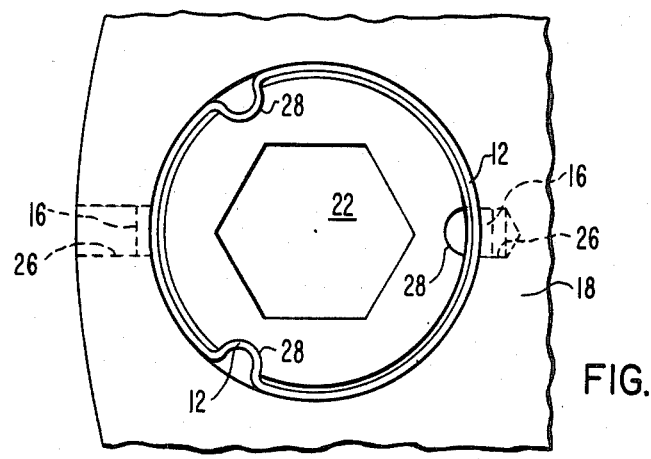
FIG. 5 is a top view of the locking ring and fastener.
Figure 6:
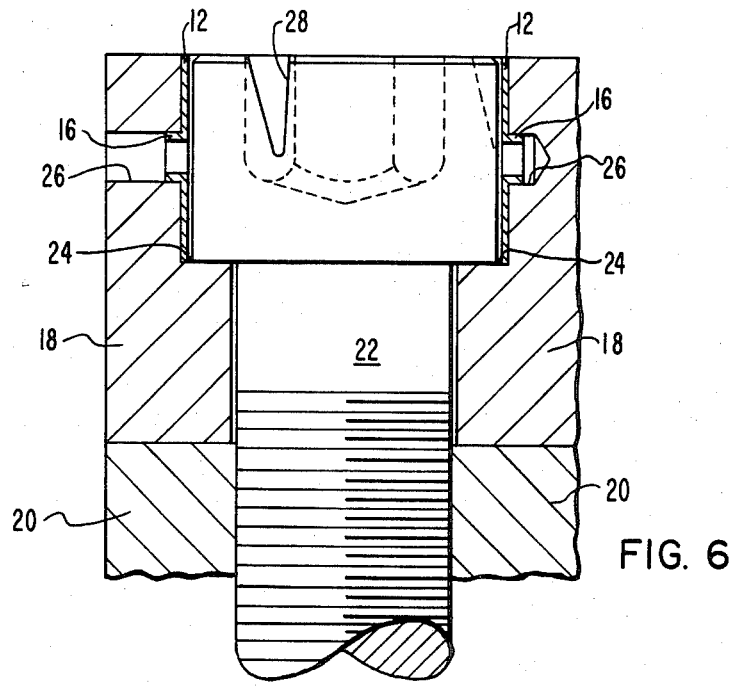
FIG. 6 is a cross-sectional view in elevation of the locking ring and fastener.

Referring to FIGS. 5 and 6, when it is desired to fasten two members together such as first member 18 and second member 20, a fastener such a bolt 22 is diposed through the members to hold the members together in a commonly understood fashion. In addition to the fastener, a locking device such as locking ring 10 may be employed to prevent inadvertent unfastening of the fastener. For example, under vibratory conditions, the fastener such as bolt 22 could become unthreaded if not restrained by a locking device. Similarly, should the fastener fracture into two or more parts a locking device such as locking ring 10 can be used to contain the parts and prevent destruction of the machine. To employ locking ring 10, a counterbore 24 and a plurality of notches 26 corresponding to the number and shape of protrusions 16 are formed in first member 18. Before the fastener such as bolt 22 is disposed in first member 18, locking ring 10 is compressed so that locking ring 10 may fit into counterbore 24 thereby allowing protrusions 16 to be disposed in notches 26. Once protrusions 16 are aligned with notches 26, ring 12 is allowed to relax thus allowing protrusions 16 to enter notches 26.

Since notches 26 are arranged in first member 18 so as to define a slightly greater included angle than the angle defined between protrusions 16 when ring 12 is relaxed, then ring 12 is placed in counterbore 24 and allowed to expand ring 12 does not totally return to its relaxed position. Rather, a slight amount of compression is maintained on ring 12 by virtue of the relative alignment of protrusions 16 and notches 26 thus holding ring 12 tightly in counterbore 24 and preventing rotation of ring 12 with respect to first member 18. Once locking ring 10 has been thus placed in counterbore 24, a fastener such as bolt 22 may be inserted through ring 12 and fastened to hold first member 18 and second member 20 together. Additionally, bolt 22 may be provided with a plurality of grooves 28 so that ring 12 may be crimped into grooves 28 thus preventing relative movement of bolt 22 with respect to ring 12 and first member 18. Since ring 12 is made from a relatively pliable material, ring 12 can be easily crimped into grooves 28 as shown in FIG. 5. While it is necessary to crimp ring 12 into only one groove 28, it is preferred to crimp ring 12 into at least two such grooves 28, thereby insuring the securing of bolt 22. With ring 12 secured to both first member 18 and to bolt 22, bolt 22 is prevented from becoming unfastened due to vibratory unthreading or similar unfastening because ring 12 prevents movement of bolt 22 with respect to first member 18. Likewise, should bolt 22 fracture into one or more parts, ring 12 will prevent those parts from being dislodged from first member 18.

Figure 1:
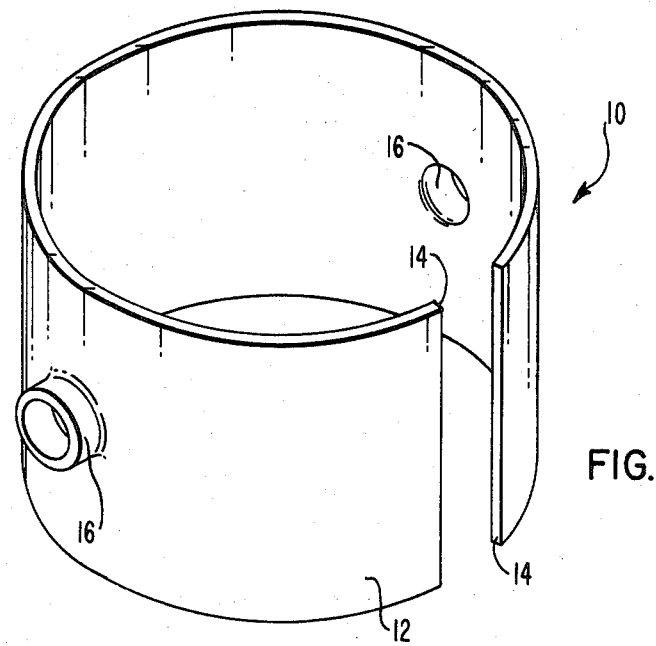
FIG. 1 is a view in perspective of the locking ring.
Figure 7:
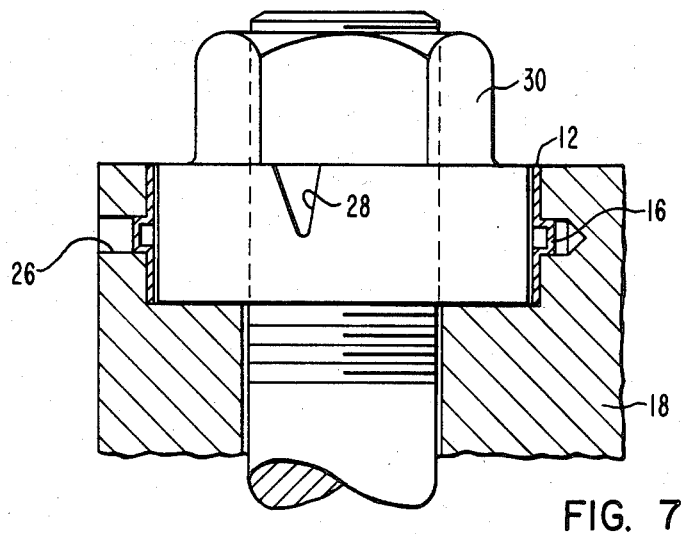
FIG. 7 is a cross-sectional view in elevation of an alternate locking ring and fastener.

As an alternative, protrusions 16 can be formed with a closed end and ring 12 can be adapted to be used with a threaded nut 30 as shown in FIG. 7. Of course, the function and effect of locking ring 10 remains the same whether used with a bolt or a threaded nut arrangement.

Therefore, the invention provides a locking device for preventing inadvertent unfastening of threaded fasteners.

I claim as my invention:

1. A fastener for securing a plurality of members together comprising:
   a first member having a first bore therethrough and having a plurality of notches on the inside surface of said first bore;
   a second member having a threaded bore therein and disposed adjacent to said first member;
   a substantially cylindrical relatively thin walled ring having a slot therein extending the entire width of said ring for providing flexibility to said ring and having at least two cylindrical protrusions formed approximately midway along the outside width of said ring with said protrusions capable of being disposed in said notches when said ring is disposed in said first bore for preventing rotation of said ring relative to said first member and with said protrusions defining an included angle therebetween of approximately 168° when said ring is in a relaxed state and an included angle therebetween of approximately 180° when said ring is in a compressed state; and
   a threaded fastener capable of being disposed through said first bore and engaged to said threaded bore for holding said members together, said threaded fastener having a groove therein for allowing said ring to be crimped into said groove thereby locking said threaded fastener to said ring with said ring thereby preventing movement of said threaded fastener with respect to said members.

* * * * *